United States Patent

[11] 3,568,148

[72] Inventor George C. Clark, Jr.
Indialantic, Fla.
[21] Appl. No. 812,743
[22] Filed Apr. 2, 1969
[45] Patented Mar. 2, 1971
[73] Assignee Radiation Incorporated
Melbourne, Fla.

[54] DECODER FOR ERROR CORRECTING CODES
10 Claims, 7 Drawing Figs.

[52] U.S. Cl. .......... 340/146.1, 235/153
[51] Int. Cl. .......... G06f 11/12, G08c 25/00
[50] Field of Search .......... 340/146.1; 235/153

[56] References Cited
UNITED STATES PATENTS

| | | | |
|---|---|---|---|
| 3,411,135 | 11/1968 | Watts | 340/146.1 |
| 3,437,995 | 4/1969 | Watts | 340/146.1 |
| 3,487,361 | 12/1969 | Frey, Jr. | 340/146.1 |

*Primary Examiner*—Malcolm A. Morrison
*Assistant Examiner*—Charles E. Atkinson
*Attorney*—Donald R. Greene ABSTRACT: A decoder for error correcting binary cyclic group codes consisting of code words to be transmitted in blocks of *n* bits including *k* information bits and *n-k* check bits, includes a syndrome calculator for computing the matrix product of each received word, which may have a maximum of *t* correctable transmission errors, with a modified form of the original parity check matrix defined by the check digits in the original code. The parity check matrix used in the computation is effectively modified by the syndrome calculator by development within the calculator of a syndrome or pattern of parity check failures corresponding to that which would be produced by multiplication of the received word with the desired modified parity check matrix. This operation spreads out the columns of the identity matrix into which the original parity check matrix is partitionable, from their original locations in consecutive columns in the original parity check matrix to spaced columns in the modified matrix, to permit examination of a larger set of error patterns than can ordinarily be contained in the syndrome. Decoding may then proceed in a conventional manner.

INVENTOR
GEORGE C. CLARK, Jr.

BY Hurvitz, Rose & Greene
ATTORNEYS

INVENTOR
GEORGE C. CLARK, Jr.
BY Hurvitz, Rose & Greene
ATTORNEYS

DECODER FOR ERROR CORRECTING CODES

BACKGROUND OF THE INVENTION

The present invention relates generally to the field of error correcting codes for digital information-processing systems, and in particular to a novel decoder for group codes, in which a larger set of parity check error patterns may be considered than has been permitted with prior art decoders.

In a block code, certain sequences of n channel symbols, or "*n*-tuples" are selected for transmission as code blocks or code words, and a statistical decision is made at the receiver regarding the specific code words transmitted, on the basis of information contained in the respective *n*-tuple. The decision process may be defined in terms of a decoding table in which actual code words (i.e., code words without error) form the first row, and error-containing code words constituting all other possible received words that are to be considered (i.e., decoded) as specific ones of the actual code words in the decision process at the receiver, are set out in columns below the respective actual code word. If the received *n*-tuple corresponds to an actual code word it is assumed that code word was in fact transmitted. If the received word does not correspond to any actual code word, the table is consulted for a decision as to which of the actual code words was transmitted. Every possible received word appears only once in the decoding table, or "lookup" table as it is sometimes called.

In his book entitled Error-Correcting Codes (MIT Press, 1961 ), Peterson provides an example of such a decoding table for four possible messages *a*, *b*, *c*, and *d*, each of which is to be transmitted as a binary block code of length five (i.e., *a* 5-tuple), with $a = 11000$, $b = 00110$ $c = 10011$, and $d = 01101$, these words constituting only four of the $2^5=32$ possible received words. The remaining 28 are listed under the respective code words into which they would be decoded, as follows:

| | | | |
|---|---|---|---|
| *a* 11000 | *b* 00110 | *c* 10011 | *d* 01101 |
| 11001 | 00111 | 10010 | 01100 |
| 11010 | 00100 | 10001 | 01111 |
| 11100 | 00010 | 10111 | 01001 |
| 10000 | 01110 | 11011 | 00101 |
| 01000 | 10110 | 00011 | 11101 |
| 11110 | 00000 | 01011 | 10101 |
| 01010 | 10100 | 11111 | 00001 |

In the above table, each of the first five words below the actual code word is decoded as that code word, and it will be observed that in each case the received word differs in only one position from the code word into which it is decoded, the single error being commonly referred to as a Hamming distance of 1 between the transmitted word and the received word. Beneath the dashed lines in each column are listed two of the eight received words that do not fit in the pattern of a Hamming distance of 1. It will be observed, in any case, that the decoding table is not infallible, particularly as the Hamming distance between the transmitted word and the received word increases.

In a cyclic code, the code word may be made up of *n* positions, with *k* information symbols (digits) and *n–k* check symbols. A necessary step in decoding any group code, including cyclic codes, binary shortened cyclic codes, pseudocyclic codes, and codes with multisymbol alphabets, is to determine the so-called "syndrome" or pattern of parity check failures in the received word. The syndrome is defined in Peterson, op cit, page 36, and will be discussed in detail in the ensuing description of the invention. For present purposes it is sufficient to observe that the syndrome is the matrix product of the received word and the parity check matrix. There is a one-to-one correspondence between the set of all correctable error patterns and the set of all syndromes. The basic problem in decoding the group code is to determine the error pattern that goes with a particular syndrome without need for resort to extensive "lookup" tables of the general type discussed earlier. The concept of decoding group codes by calculation of the syndrome followed by comparison of the syndrome to a group of selected error patterns, each corresponding to a correctable error pattern, is found in Slepian, "A Class of Binary Signalling Alphabets," Bell System Technical Journal, vol. 35, Jan. 1956.

For cyclic codes, the parity bits associated with the code may be generated at the encoder by a feedback shift register, and the syndrome thereafter computed at the decoder by means of an almost identical feedback shift register. In fact, the row space of the generator matrix *G* is the null space of the parity check matrix *H* employed at the receiver, as will be discussed in greater detail presently. As is well known, if the error pattern is completely contained within the first *p* bit positions of the received word, where *p* is the number of parity bits in the word, then the syndrome will be identically equal to the error pattern. Moreover, if the error pattern is not completely contained within the first *p* bit positions of the received word, but can be placed therein by a cyclic shift of the symbols (elements or bits) in the received word, the syndrome can be made identical to the shifted error pattern simply by shifting the feedback shift register containing the syndrome (i.e., the register at the decoder, used to compute the syndrome) through the same number of positions as the received word was shifted.

In essence, the syndrome calculator of the decoder provides a "window" by which the received work may be "looked into" to observe the error pattern, provided that pattern is completely contained within *p* consecutive bit positions. For multiple random error correcting codes and burst error correcting codes, the error pattern found in the above manner is easily recognized by means of conventional threshold logic.

SUMMARY OF THE INVENTION

The present invention provides means for enlarging the "-window" through which the error pattern in the received word may be observed, so that the error pattern is not restricted to *p* consecutive bit positions, but may instead occur within *p* bit positions that are not adjacent. As a result, a much larger set of error patterns can be contained in the window positions, when cyclic shifting is used in the aforementioned manner, than was heretofore possible.

DESCRIPTION OF THE PREFERRED EMBODIMENTS

Before proceeding with a detailed description of my invention some additional discussion of terminology and generalized decoder operation may be helpful. The basic mathematical operations performed by a decoder of the general class in which my decoder falls are described by Prange in an article entitled "The Use of Information Sets in Decoding Cyclic Codes" in IRE Transactions on Information Theory, Vol. IT–8, Sept. 1962. In addition, specific decoders in that general class having some features in common with the decoder of the present invention, but differing from the basic concept of the invention, are described in the following publications:

Kasami, "A Decoding Procedure for Multiple Error Correcting Cyclic Codes," IEEE Transactions on Information Theory, Apr. 1964.

Nesenbergs, "A Combinatorial Problem and a Simple Decoding Method for Cyclic Codes," IEEE Transactions on Information Theory, Jul. 1964.

Rudolph et al. "Implementation of Decoders for Cyclic Codes," IEEE Transactions on Information Theory, Jul. 1964.

Meggitt, "Error Correcting Codes and Their Implementation for Data Transmission Systems," IRE Transactions on Information Theory, Oct. 1961.

A vector subspace $V$ of $n$-tuples is called a cyclic subspace or a cyclic code if for each vector or code word $v=(a_0,a_1, ..., a_{n-1})$ in $V$, the vector or code word $v=(a_{n-1},a_0, a_1, ..., a_{n-2})$ obtained by shifting the components of $v$ cyclically one unit to the right, is also in $V$. See Peterson, op cit, Chapter 8.

Figure 1:
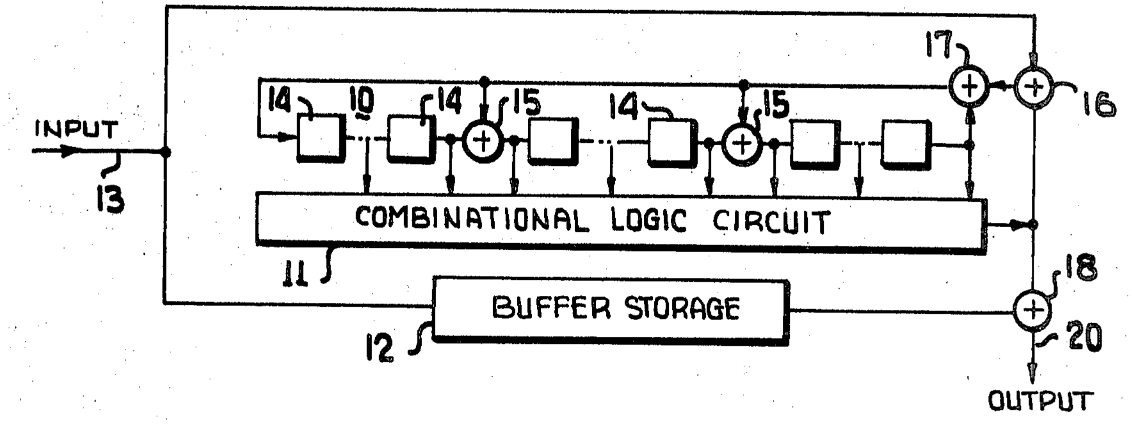
FIG. 1 (PRIOR ART)
FIG. 1 is a block diagram of one type of prior art decoding circuit for error correcting cyclic group codes.

A generalized prior art decoder (error corrector) for cyclic codes is described by Peterson, op cit, Chapter 11, and is reproduced in part here as FIG. 1 for the sake of convenience. They syndrome calculator is an $n$-$k$ stage feedback shift register 10 (Peterson, op cit, FIG. 8.2 and accompanying description) where $n$ is the length of the received word having $k$ information bits. A combinational logic circuit 11 is constructed and arranged (see Peterson, op cit, Chapter 10) to provide an output of 1 (for the binary case) if a correctable error pattern appears in shift register 10 and a 1 (an error) appears in the highest-order position of the register. An n-stage buffer unit 12 is provided to store the received word. In operation, the received word on input line 13 is simultaneously read into buffer 12 and into shift register 10. If and only if the calculated syndrome in the shift-register, as computed by the shifting of the register through the several stages 14 thereof in combination with the operation performed by logical blocks in the form of modulo-2 adders (e.g., 15) appearing between selected stages and receiving an input from both the immediately preceding stage and the symbol being read into the shift register (via adders 16 and 17), corresponds to a correctable error pattern with an error in the highest-order symbol (i.e., next to exit buffer 12), logical circuit 11 generates a 1 output. If the output of logical circuit 11 is a 1, the next bit from the buffer is corrected by mod-2 addition of the 1 thereto in adder 18; and the 1 (logical circuit output) is also added to the feedback line of shift register 10 in adder 16, the shift register having been shifted concurrently with the reading out of a symbol from buffer 12, thereby modifying the calculated syndrome to correspond to the altered (corrected) received vector (word). This operation of adding (in mod-2) the logical circuit output to the next symbol read out of buffer 12 and to the feedback path of the shift register is continued until the entire received word is read out of the buffer. Upon conclusion of this operation the shift register contains only *0*'s if all errors have been corrected; otherwise, the error pattern is uncorrectable with the particular logical circuit employed. The corrected word is serially read out on output line 20.

As previously observed, the syndrome is the matrix product of the received word with the parity check matrix. By way of further explanation, assume that a binary group code (or vector space) $v$ has the dimension $k$, that is, the set of code words (or vectors) in $V$ has length $k$. The null space of $V$ is a vector space $V'$ of dimension $n$-$k$. A matrix $H$ of rank $n$-$k$ having the vector space $V'$ as its row space has a null space of $V$. Then any vector (code word) $v$ is in the vector space (binary group code) $V$ if and only if that vector is orthogonal to every row of $H$. Mathematically, this may be restated in the form that a word $v$ is in the code $V$ if and only if $v H^T = O$ where $H^T$ is the transpose of $H$, i.e., a matrix whose rows are the columns of $H$ and whose columns are the rows of $H$. Thus, for example, if $v$ is composed of the elements $a_1, a_2, a_3, ..., a_n$, and $h_{ij}$ is the element in the $i^{th}$ row and $j^{th}$ column of the matrix $H$, then for each row $i$ of $H$ $\Sigma_j a_j hij = O$. The matrix of $H$ is the parity check matrix of the group code $V$, that has $v$ as one of its code words.

For any received word $v$, the component vector $S = v H^T$ is the syndrome, sometimes called the parity check vector, or the corrector. Since the code $V$ is the null space of $H$, a received word $v$ is a code word in $V$ if and only if $S = v H^T = O$.

The key mathetmatical concept of the present invention resides in the precise form taken by the parity check matrix $H$. If $H$ is in systematic form, in which the last $n$-$k$ components of each code vector is a linear combination of the first $k$ components, then H may be partitioned as $H = [I \vdots A]$ where I is what is known as the identity matrix of the code and $A$ is the remaining matrix. An identify matrix is defined as an $n \times n$ (i.e., square) matrix whose rows are linearly independent and in echelon canonical form (Peterson, op cit, page 25) in which 1's are located on the main diagonal and 0's are located in each of the other positions of the matrix. It is through the identity matrix that the syndrome calculator provides the aforementioned window to look into the received word and observe the error pattern.

According to the present invention this window is enlarged (i.e., is "spread out") to permit separation of the $p$ positions containing the error pattern. That is, the $p$ positions are no longer adjacent (consecutive), thereby enabling a much larger set of error patterns to be contained within the window positions than was possible using the prior art techniques, when the shifting property is used (i.e., when a cyclic shift of the elements of the received word is performed to place the error pattern in the $P$ spaced positions). Enlarging the window is accomplished by spreading out the columns of the identity matrix, and this in turn is achieved by modifying the original parity check matrix to form a new parity check matrix whose rows are a linear combination of the rows of the original matrix.

Since the syndrome calculator operates to multiply the received word with the parity check matrix, each of which is defined in terms of a polynomial, the desired modification of the parity check matrix as described above may be performed by computing a new syndrome which is in essence a linear transformation of the original syndrome. This is tantamount to forming a new parity check matrix $H$ whose rows are a linear combination of the rows of the original $H$ matrix.

Referring now to FIG. 2 *a*, the syndrome calculator 25 associated with a polynomial $g(x) = 1 + X + X^3$ and with the parity check matrix $H$, where $$H=\begin{bmatrix} 1 & 0 & 0 & 1 & 0 & 1 & 1 \\ 0 & 1 & 0 & 1 & 1 & 1 & 0 \\ 0 & 0 & 1 & 0 & 1 & 1 & 1 \end{bmatrix}$$

employs a plurality of linear circuit elements of the type described by Peterson, op cit, Chapter 7. In particular, elements 30 and 32 are modulo-2 adders, each having a pair of inputs and an output, the output being the sum of the two inputs. That is, application of identical bits (i.e., both 1's or both o's) to the two inputs results in an output of *o*, whereas the appearance of a 1 at either input and a 0 at the other input results in a 1 output. Accordingly, each of the modulo-2 adders 30 and 32 may be implemented by an "exclusive-or" logical circuit, and this also applies to elements having the same symbol in the other FIGS. of the drawing. Elements 31, 33, and 34 of syndrome calculator 25 are storage devices, each usually constituting one stage of a shift register, although a delay unit might be employed in instances where a single bit length delay is desired. Thus, syndrome calculator 25 is basically a feedback shift register having a feedback line or feedback path 35 between output 36 and input 29, with additional logic built in. Part of the logical circuitry of the calculator may include a plurality of constant multiplier between feedback line 35 and the modulo-2 adders at the input and between the shift register stages. For a binary code, each multiplier is either for multiplication by the constant 1 or by the constant 0. However, multiplication by 0 is the same as no operation and multiplication by 1 is the element itself; hence, the constant multiplier 0 is merely no connection (and no adder would therefore be required), whereas the constant multiplier for 1 is simply a connection. In the syndrome calculator of FIG. 2*a*, then, the lines 37 and 38 from the feedback path to adders 30 and 32, respectively, represent constant multipliers for the constant 1.

Figure 2A:
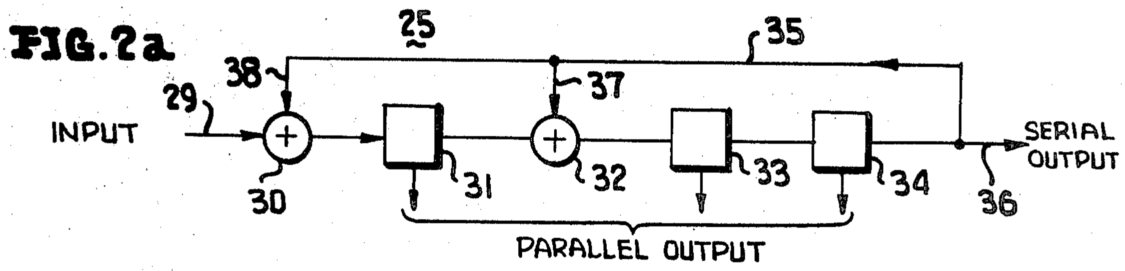
FIG. 2 *a*, *b* and *c* are block diagrams of syndrome calculators for use in computations with the original parity check matrix; for use in modifying the parity check matrix by a linear transformation of the output of the syndrome calculator; and for use in modifying the parity check matrix by feeding back and feeding forward from multiple points in the syndrome calculator, respectively.
Figure 2B:
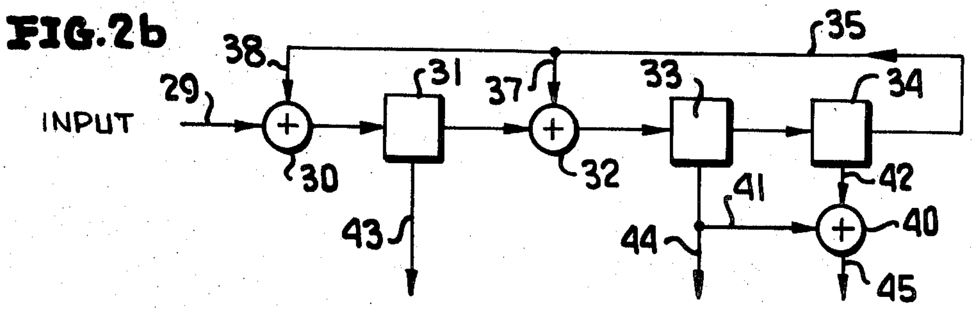
Figure 2C:
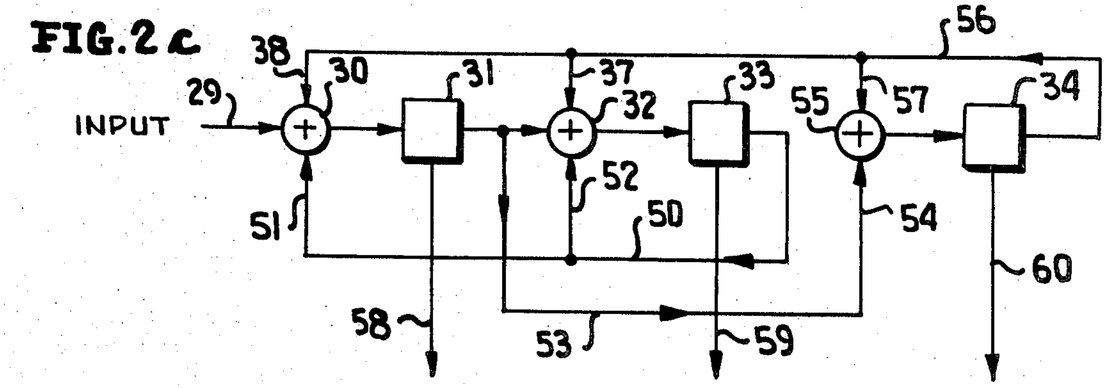

In operation of the syndrome calculator of FIG. 2*a*, an input polynomial in the form of a received word constituting coefficients $a_o, a_1, a_2, ..., a_n$ of $v(x)$ is to be divided by the polynomial $g(H)$ and the remainder retained as the syndrome $= 1 + X + X^3$ for the original parity check matrix set forth above, for this example). This accomplishes precisely the same result as multiplying the received coefficients by the matrix $H$. See Peterson, op. cit., Chapter 7. As previously observed, the row space of the generator matrix $G$ is the null space of $H$, and vice versa. Initially, storage devices 31, 33 and 34 contain 0's and the coefficients a $(X)$ (i.e., of the received word) enter the register high order first. With each incoming bit, the shift register undergoes a shift (controlled from a source of clock pulses, not shown), and this operation continues with performance of logical multiplication and modulo 2 addition, until the entire received word has been inputted (i.e., entered). At this time, a polynomial representing the remainder produced by dividing $vX$ by $gX$ is contained in storage devices 31, 33 and 34.

It will be observed that the first three columns of the original parity check matrix $H$, above, form the identity matrix. That is, the identity matrix, in this example, is $$I=\begin{bmatrix}1 & 0 & 0\\ 0 & 1 & 0\\ 0 & 0 & 1\end{bmatrix}$$

The columns of the identity matrix may effectively be interchanged with other columns of the parity check matrix to separate the former columns and thereby spread out the window positions by which the error pattern is observed. One example of a modified parity check matrix having rows that are a linear combination of the rows of the original parity check matrix is $$H=\begin{bmatrix}1 & 0 & 0 & 1 & 0 & 1 & 1\\ 0 & 1 & 0 & 1 & 1 & 1 & 0\\ 0 & 1 & 1 & 1 & 0 & 0 & 1\end{bmatrix}$$

in which the original identity matrix columns are now columns 1, 5, and 3, respectively. One method by which this modification may be implemented is to compute the original syndrome and then perform a linear transformation of the contents of the shift register to create a new syndrome.

In the syndrome calculator of FIG. 2*a* the error pattern is observed by examining the contents of the three stages of the shift register without alteration. The syndrome calculator of FIG. 2*b*, on the other hand, is a modification of the calculator of FIG. 2*a* only to the extent that a linear transformation is performed on the actual contents of the shift register, but this effectively constitutes the provision of the desired modified parity check matrix in which the identity matrix columns are no longer adjacent one another, as exemplified by the $H$ matrix shown immediately above. In particular, in the calculator of FIG.2*b*, the received word is entered, one bit at a time, into the calculator and subjected to logical manipulation as required to obtain the matrix product of the received word with the original parity check matrix. With 0's initially in storage devices 31, 33 and 34, the highest order bit is applied to input 29 and added modulo-2 with the bit leaving stage 34 by adder 30, the sum being entered in stage 31 as the shift register undergoes a cyclic shift through one position. With application of the next bit in the received binary word to the calculator, the bit in stage 31 is shifted to the right for addition modulo-2 with the bit feedback from the last stage (34) and this sum entered into stage 33.

This operation continues until the entire received word has been entered into the shift register. At that point the contents of the shift register stages may be examined to determine whether an error has occurred in the received word. Instead of examining the actual contents of each of the shift register stages, however, the contents of stages 33 and 34 are added modulo-2 in adder 40 via lines 41 and 42 and this sum is used in place of the content of stage 34. That is the contents of the shift register are taken, for purpose of examining for errors, as the bits appearing on lines 43, 44 and 45. The addition modulo-2 of the last two stages as one of the parallel contents of the calculator of FIG. 2*b* constitutes a linear transformation of the parallel output of the original calculator (i.e., the calculator of FIG. 2*a*).

The same effect may be achieved by a change of the polynomial (or more accurately, the coefficients of the polynomial) with which the received word is divided by the syndrome calculator to obtain the matrix product. However, this requires significantly greater structural change of the feedback shift register than was the case with the linear transformation of the output in the circuit of FIG. 2*b*, as will be apparent by reference to the circuit of FIG. 2*c*. Dual multiplication of the type practiced here is fully explained in Peterson, op cit, Chapter 7, and need not be belabored here. The original feedback shift register of FIG. 2*a* is modified in the calculator of FIG. 2*c* by removing the direct path between stages 33 and 34 and feeding back the output of stage 33 on line 50 to adder 30 via constant 1 multiplier 51 and to adder 32 via constant 1 multiplier 52; feeding forward the output of stage 31 on line 53 via constant 1 multiplier 54 to adder 55 whose other input is supplied by stage 34 via feedback line 56 and constant 1 multiplier 57, and whose output sum is fed as an input to stage 34; and feeding back the output of stage 34 on line 56 to adder 30 via multiplier 38 and to adder 32 via multiplier 37. With the logic circuitry and connections indicated, the syndrome calculator of FIG. 2*c* divides the received word by $g(x) = 1 + X + X^2$ and by $g(x) = 1 + X + X^3$. The error pattern is then examined by reference to the contents of the shift register stages on lines 58, 59 and 60.

Figure 3:
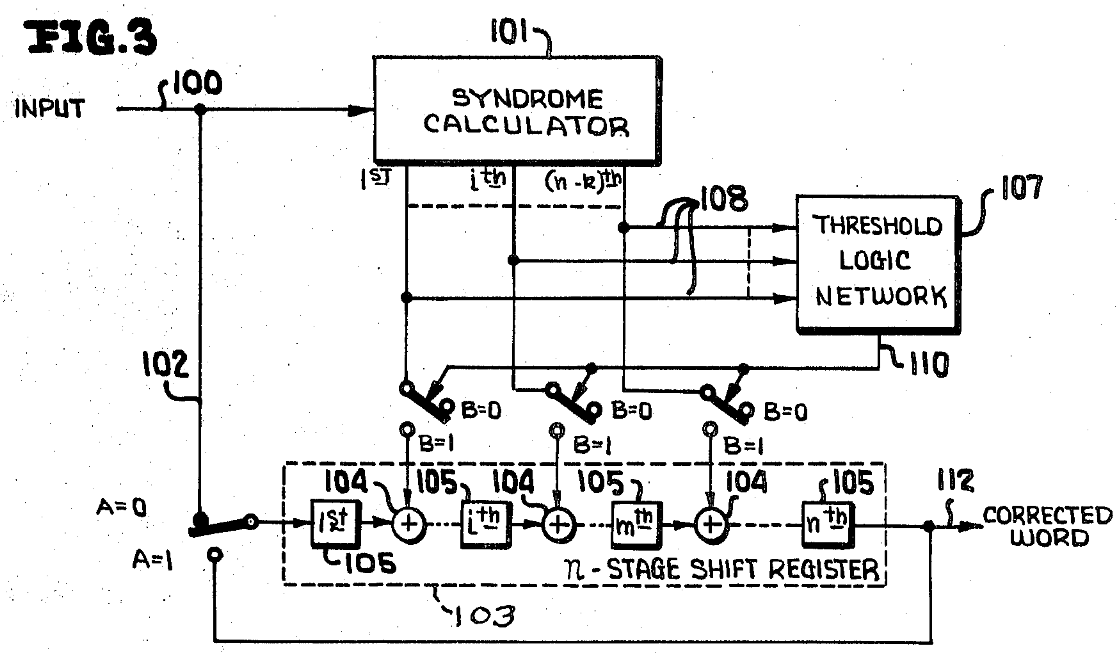
FIG. 3 is a block diagram of a decoder circuit for error correcting cyclic group codes using a syndrome calculator of the type shown in FIG. 2 *b* or *c*.

A generalized decoder for an $(n, k)$, $t$ error correcting, cyclic group code, that is a code of block (word) length $n$, where $k$ is the number of information digits per block and $n-k$ is the number of check digits per block, that uses a syndrome calculator of the type described above for modifying the parity check matrix normally associated with the code, is shown in FIG. 3. The assumption is made that each code word contains a number of errors less than or equal to $t$, where $t$ is the maximum number of always correctable errors. Initially, switches A=B=O so that the received word from the encoder (not shown) is applied as an input on line 100 to syndrome calculator 101, and simultaneously on line 102 via switch A to $n$-stage shift register 103. The syndrome calculator 101 has $n-k$ stages and constitutes a modification by means of appropriate feedback connections and logic circuits, of the syndrome calculator (also of $n-k$ stages) that would normally be implemented for the particular code under consideration, to change the normal parity check matrix for that code to a new parity check matrix in which the identity matrix columns (and, hence, the "window positions" in the $n-k$ stages) are nonadjacent (i.e., spaced from one another), using the principles discussed above with reference to FIGS. 2*b* and 2*c*.

Initially, the register of calculator 101 and the $n$-stage shift register contain only $o$'s. The entire received word is entered into the shift register of syndrome calculator 101, the shift register undergoing a single shift to the right as each symbol (digit) of the word is entered. The word, of course, is subjected, in the calculator, to the logical manipulations required to produce the modified syndrome for examination purposes, throughout its entry into the shift register. At the same time the entire received word is inputted, one bit at a time, into $n$-stage shift register 103. The modulo-2 adders 104 between stages 105 of register 103 have no effect on this operation since, as previously stated, switches $B = o$ at this time, and the $o$ input to each modulo-2 adder as a consequence of the absence of a connection does not permit a change in the output in the respective adder from what appears as an input thereto.

After the entire $n$-bit sequence constituting the received word has been entered into calculator 101 and register 103, switch A is changed to $A = 1$, thereby completing a feedback path between input and output of register 103. The syndrome calculator and $n$-stage shift register are then advanced simultaneously one bit at a time to circulate the contents of the register 103. Following each shift, a test is made using threshold logic network 107, which is connected to sense the bits in the window positions of the $n-k$ stages of the register in calculator 101, via lines 108, to determine the number of 1's among those bits is less than or equal to $t$. As previously observed, if the syndrome is identically equal to zero, i.e., each of the window positions of the $n-k$ stages of the register contains a $o$ at the conclusion of any single shift, then the received word is an actually transmitted code word, i.e., is free of error, and no correction is necessary. However, if it is detected by the threshold logic network 107 that $t$ or fewer 1's are contained in the window positions $n-k$ stages of the syndrome register, the correctable error pattern is known to be present in those positions of the syndrome register, and the logic network supplies a command on line 110 to change switches B to B = 1. This permits the syndrome, which as observed earlier is identically equal in such a case to the error pattern, as represented by the bits in the $n-k$ window positions of the syndrome register, to be added modulo-2 in adders 104 to the window positions of the received word as presently contained in $n$-stage shift register 103. Following that addition, the shifting of register 103 is continued, with switches B changed to B = $o$, until the corrected received word appears in the proper sequence in the first to $n$th stages of register 103. For this purpose, it is merely necessary to maintain a count of the number of shifts, as is well known, to provide an indication of the present position of the first bit of the received word in the $n$-stage register. The corrected word is then simply read out of register 103 on line 112 and the contents of syndrome calculator 101 are set to zero in preparation for the next word on input line 100.

If after one complete circulation of the contents of register 103 no threshold indication is obtained from network 107, i.e., more than $t$ errors are present, then it is assumed an uncorrectable error pattern has occurred, and the received word is so tagged.

Figure 4:
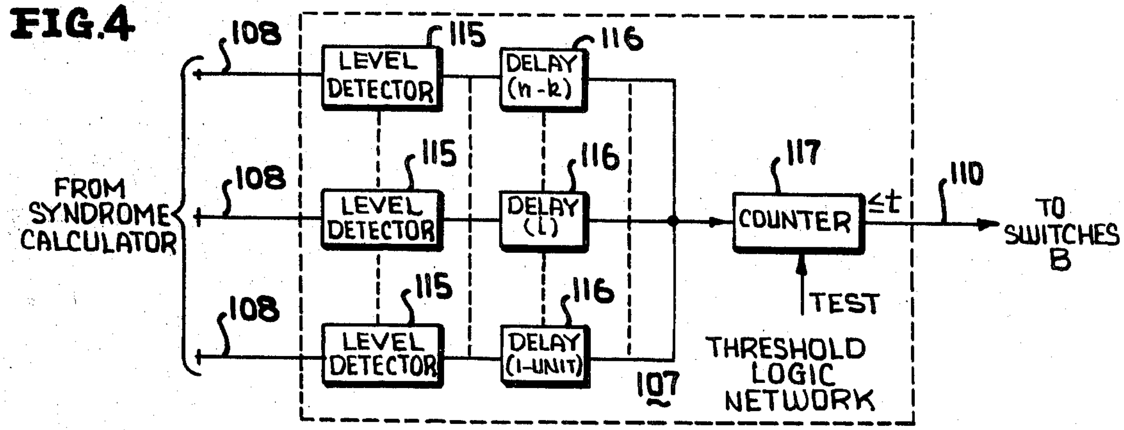
FIG. 4 is a block diagram of a threshold logic network for use in the decoder of FIG. 3.

Threshold logic network 107 may be implemented in any suitable manner, obvious to those skilled in the art to which my invention pertains. One example of a suitable circuit is shown in FIG. 4. The contents of the $n-k$ stages of the register in syndrome calculator 101 are examined on lines 108 by level detectors 115, implemented to sense a 1 on the respective input line, and to supply a pulse indicative of the appearance of a 1 to a respective delay unit 116. A Schmitt trigger circuit having a level set below that of the 1 level is suitable for this purpose. Of course, if a syndrome register stage contains a $o$, its associated level detector 115 in network 107 does not supply an output pulse to a delay unit. Each of delay units 116 has a different delay time, e.g., corresponding in units of delay to the number of the respective stage of the syndrome register with which it is associated, so that pulses are supplied by the delay units to a counter 117 in sequence. At the conclusion of the greatest delay time of units 116, the counter is tested to determine whether its count is $\leq t$, and if so to supply a command pulse to line 110 to change the state of switches B to B = 1.

Figure 5:
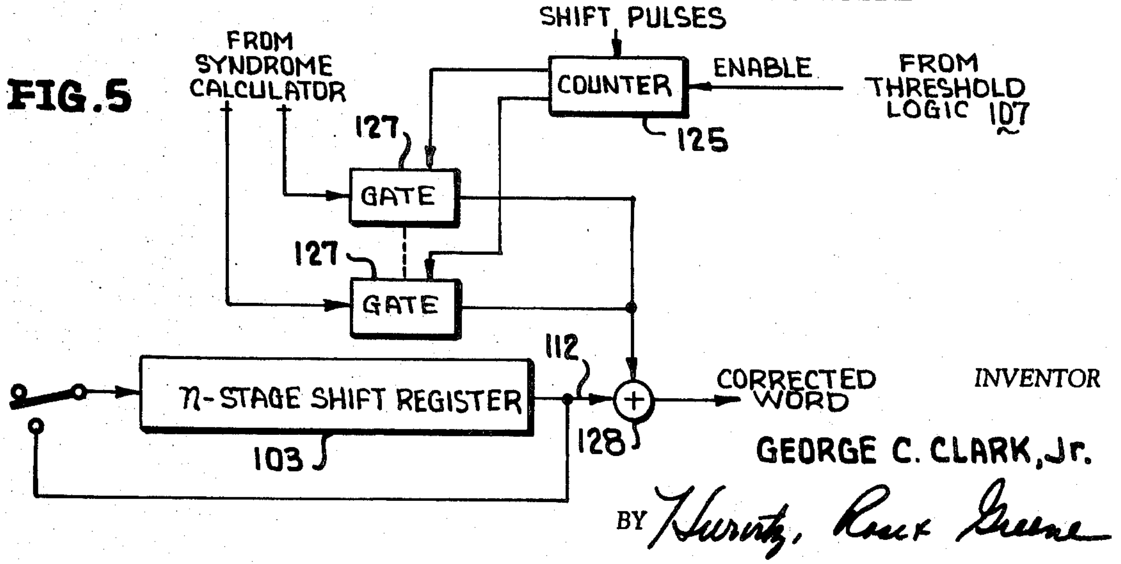
FIG. 5 is a modification of the decoder of FIG. 3.

While in the exemplary decoder circuit of FIG. 3 the errors are corrected simultaneously by parallel addition of the error pattern to the proper bit positions of the received work in $n$-stage register 103, they may instead be corrected sequentially while reading out the received word from the $n$-stage register, simply by keeping track of the shift distance between the window positions of the syndrome calculator and the received word bit positions. One example of such a circuit is shown in FIG. 5 A count is maintained in counter 125 of the shifts of $n$-stage register 103 as the received word is read out on line 112, after the counter has been enabled by a threshold logic network detection of a number of 1's $\leq t$ in the syndorme calculator. As counter 125 counts upwardly, each counter stage corresponding to a window position in the syndrome calculator register sequentially supplies a gating signal to a respective gate 127 associated with the syndrome register stage for that window position, as that counter stage is energized. In this manner the appropriate bit in a window position of the calculator is added modulo- 2 in adder 128 to the proper bit position in the received word as the latter is sequentially read out of $n$-stage shift register 103.

I claim:

1. A decoder for an error correcting digital group code transmitted from an encoder in the form of consecutive code words of block length $n$ including $k$ information digits and $n-k$ check digits, and having associated therewith a known parity check matrix containing an identity matrix as consecutive columns of the parity check matrix, said decoder being capable of correcting a maximum number of $t$ transmission errors in a received word, said decoder comprising:
   - a syndrome calculator responsive to each word received from said encoder for computing the matrix product of said received word with a modified form of said parity check matrix in which said columns forming said identity matrix are separated from one another in the modified parity check matrix, said matrix product constituting a syndrome defining the pattern of transmission errors in said received word;
   - an $n$-position storage means responsive simultaneously with said syndrome calculator to said received word for storage of said received word, and means for selectively coupling predetermined positions in said storage means to selectively circulate the contents of said storage means;
   - said selective coupling means being responsive to completion of entry of the entire received word into said syndrome calculator and into said storage means for circulating said received word in said storage means one digit at a time;
   - said syndrome calculator including a $n-k$ position storage means for storing said computed syndrome in the form of a series of $n-k$ digits, said syndrome being advanced in position synchronously in said calculator storage means with the digit-by-digit circulation of said received word in said $n$-position storage means and being thereby subjected to continued recalculation;
   - means responsive to the digits stored in said calculator storage means at each single digit advancement thereof for detecting the existence of $t$ or fewer errors in said received word and thereby identifying a correctable error pattern in said received word; and
   - means for selectively adding the digits in the $n-k$ positions of said calculator storage means to positions of said recieved word in said $n$-positions storage means predetermined to produce correction of the errors in said received word, when the existence of $t$ or fewer errors in detected by said error detecting means.

2. The decoder according to claim 1 wherein said syndrome calculator provides said modification of the parity check matrix normally associated with said code by effective formation of a new parity check matrix whose rows are a linear combination of the rows of said normally associated parity check matrix.

3. The decoder according to claim 2 wherein said syndrome calculator provides said parity check matrix modification by computing the syndrome as the product of said received word and said normally associated parity check matrix, followed by linearly transforming the contents of said $n-k$ position storage means to a new set of contents constituting the syndrome that would be derived by computing the matrix product of said received word with said modified parity check matrix.

4. The decoder according to claim 2 wherein said syndrome calculator provides said parity check matrix modification by feeding backward and feeding forward between multiple points in said $n-k$ position storage means to compute a syndrome corresponding to that syndrome that would be derived by computing the matrix product of said received word with said modified parity check matrix.

5. The decoder according to claim 1 wherein said selective adding means comprises means for correcting the error pattern in said received word by parallel addition of said digits in the $n-k$ positions of said calculator storage means to the respective selected $n-k$ positions of the received word in said $n$-position storage means.

6. The decoder according to claim 1 wherein said selective adding means comprises means for correcting the error pattern in said received word by serial addition of said digits in the $n-k$ positions of said calculator storage means to the digits in the respective $n-k$ positions of the received word upon readout from said $n$-position storage means.

7. A decoder for an error correcting binary cyclic group code consisting of code words to be transmitted in blocks of $n$ bits including $k$ information bits and $n-k$ check bits, said check bits being a linear combination of the $k$ information bits specified by a parity check matrix used at the decoder in determining the pattern of errors in each received word, said received words having a maximum of $t$ correctable transmission errors, said decoder comprising:

a syndrome calculator including an $n-k$ stage shift register and logic means coupled to predetermined stages of said register for computing the product of each received word with the parity check matrix, as a pattern of the parity check failures in the received word, and further including means coupled to said logic means and to said register for developing a modified pattern of parity check failures in the form of bits in said $n-k$ stages conforming to the product of said received word with a modified parity check matrix whose rows are a linear combination of the rows of the original parity check matrix;

an $n$-stage shift register responsive to the incoming bits in said received word simultaneously with entry thereof in said calculator shift register for complete storage of said received word in the received sequence of bits, and including means for selectively coupling the input and output terminals of said $n$-stage register to circulate the stored word upon completion of entry into said $n$-stage shift register;

said syndrome calculator responsive to said circulation of said received word in said $n$-stage shift register to synchronously advance said modified pattern of parity check failures in said calculator storage register one bit at a time;

means responsive to the modified pattern of parity check failures currently existing in said calculator register with each one bit advance, for detecting the existence of $t$ or fewer errors within said pattern; and means for selectively adding the bits in the $n-k$ stages of said calculator storage register to bits in respective positions of the received word as currently stored in said $n$-stage storage register to correct the errors in said received word, when the existence of $t$ of fewer errors is sensed by said detecting means.

8. In a decoder for error correcting digital group codes transmitted as consecutive code words of block length $n$ including $k$ information digits and $n-k$ check digits, said check digits being a linear combination of said $k$ information digits as specified by a known parity check matrix for the code, said matrix containing an identity matrix as consecutive columns thereof and utilized in the decoder to determine the pattern of errors in each received word, a syndrome calculator comprising:

means for storing a sequence of $n-k$ digits and for selectively advancing the sequence of stored digits in accordance with successive digits in $n-k$ positions of a code word entered therein;

means for entering received code words into said storing means;

logic means connecting predetermined storage positions in said storing means to modify the sequence of stored digits by a modulo addition operation during selective advancement of the sequence; and means coupled to said logic means and to said storing means for forming from the modified sequence of digits a syndrome constituting the matrix product of the entered code word and of a modification of said known parity check matrix in which the rows of the modified parity check matrix are a linear combination of the rows of the original known parity check matrix, and the identity matrix is in nonconsecutive columns of the modified parity check matrix.

9. The invention according to claim 8 wherein said syndrome is formed by calculating the matrix product of the entered word and the original known parity check matrix, followed by linearly transforming the calculated matrix product to the matrix product of the entered word and the modified parity check matrix, using said modified sequence of digits.

10. The invention according to claim 8 wherein said logic means connects storage positions in said storage means to feed forward digits from one storage position to another and to feed back digits from one storage position to another, during selective advancement of the sequence.

UNITED STATES PATENT OFFICE

CERTIFICATE OF CORRECTION

Patent No. 3,568,148 Dated March 2, 1971

Inventor(s) George C. Clark, Jr.

It is certified that error appears in the above-identified pate and that said Letters Patent are hereby corrected as shown below:

Column 1, line 41, a separate dashed line should appear bene each set of digits in this line, as follows: -- 01000 10110 00( 11101 --. Column 3, line 12, first word "$a_{n-1}$" should end in clo parenthesis: -- $a_{n-1}$) --; same line, lower case "v" in equation sho read -- v' --; line 57, "v" should read -- V --; line 70, that portio the equation reading "hij" should read -- $h_{ij}$ --. Column 4, line 24 should read -- p --; line 64, "multiplier" should read -- multiplier Column 5, line 4, "g(H)" should read --g(X); same line, after "synd insert -- (where g(X) --; line 19, "vX by gX" should read -- v(X) b g(X) --; line 66, "feedback" should read -- fed back --. Column 7, 69, after "5" insert -- . --; line 72, "syndorme" should read -- sy --. Column 8, line 50, "recieved" should read -- received --; san "positions" should read -- position --.

Signed and sealed this 24th day of August 1971.

(SEAL)
Attest:

EDWARD M.FLETCHER,JR.
Attesting Officer

WILLIAM E. SCHUYLER, JR.
Commissioner of Patents